March 12, 1946. F. B. ROBB 2,396,287
SCRAPER VEHICLE
Filed May 27, 1943 3 Sheets-Sheet 1
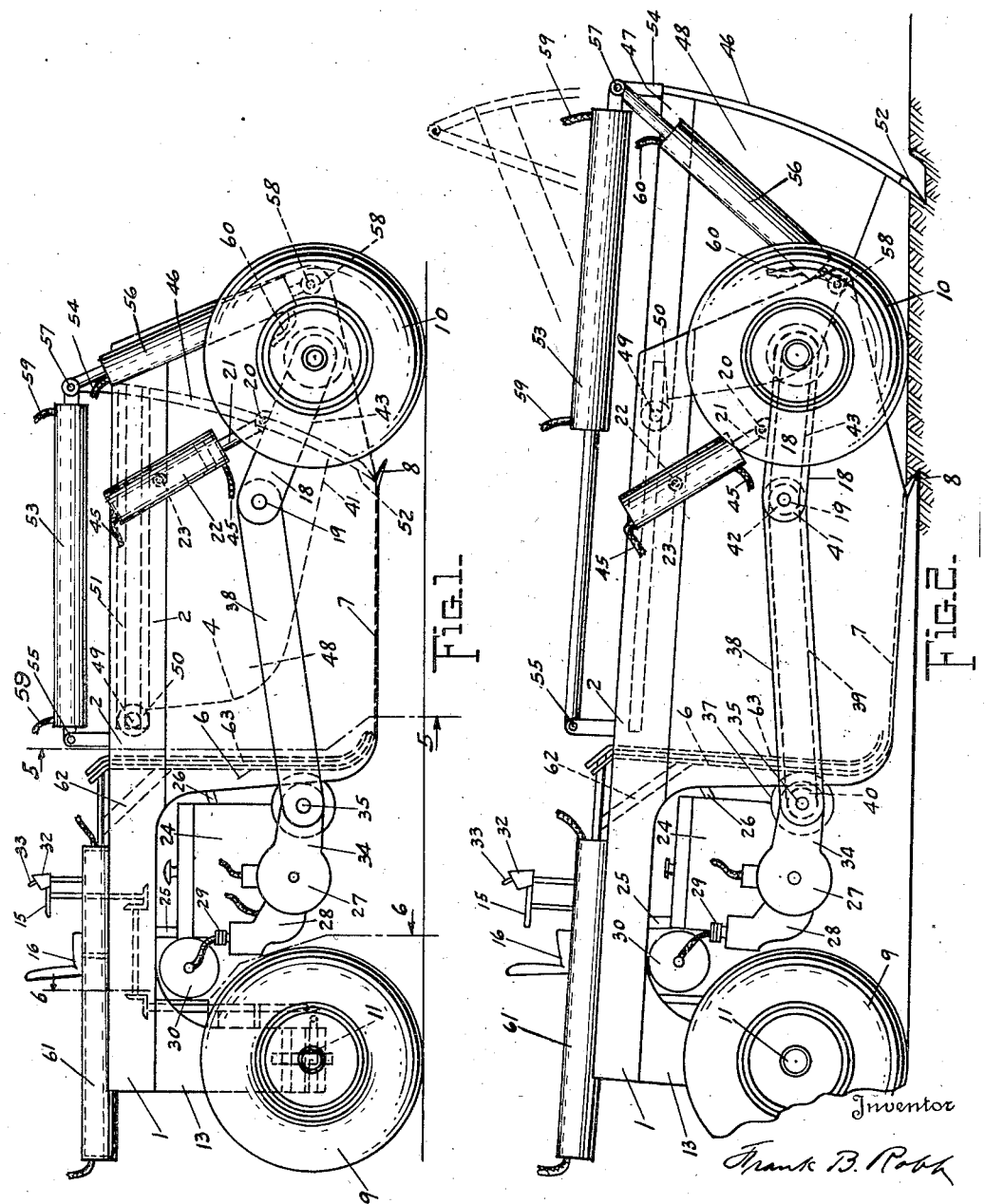
Inventor
Frank B. Robb
By Robb & Robb
Attorneys March 12, 1946.   F. B. ROBB   2,396,287
SCRAPER VEHICLE
Filed May 27, 1943   3 Sheets-Sheet 2
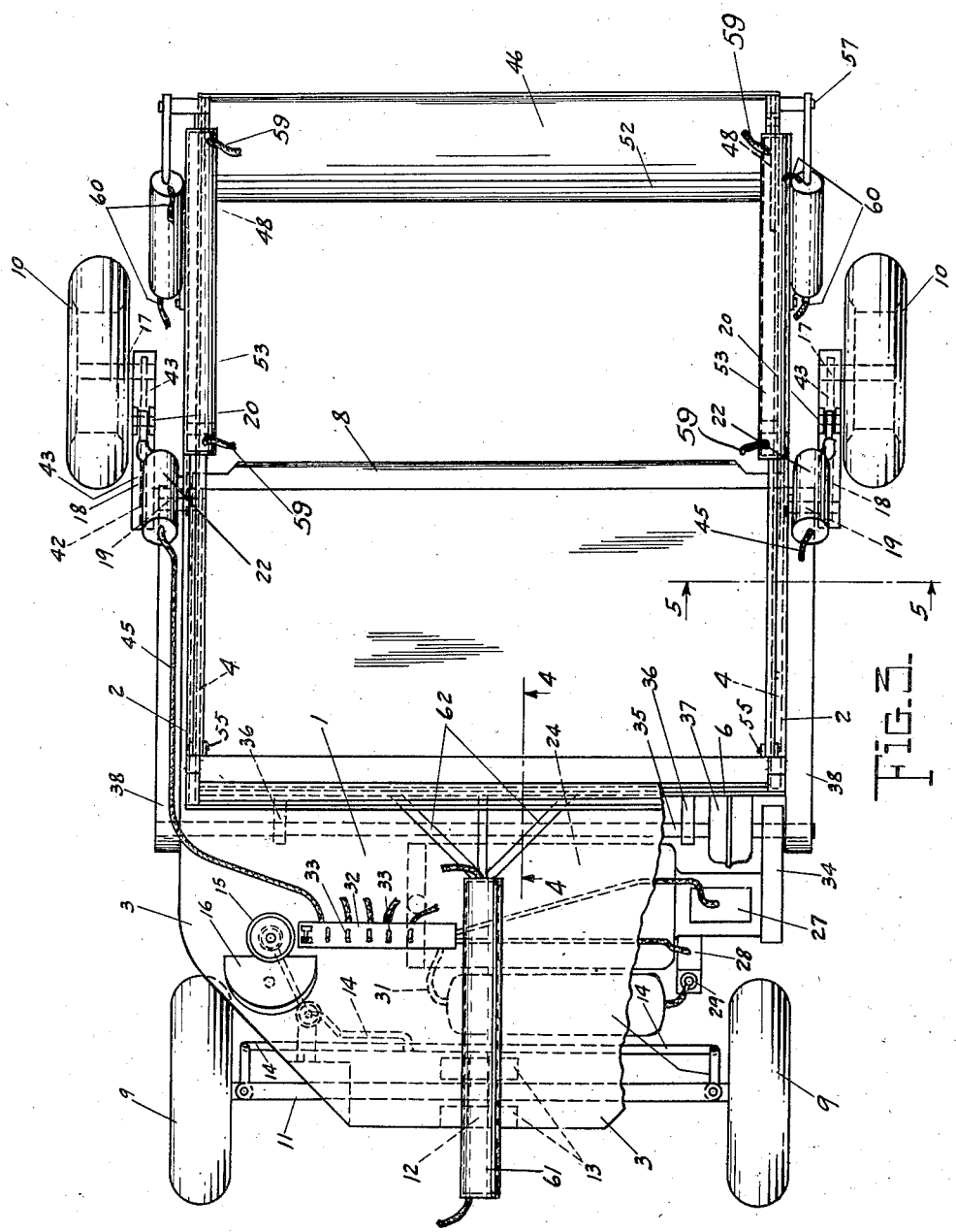
Inventor
Frank B. Robb
By Robb & Robb
Attorneys

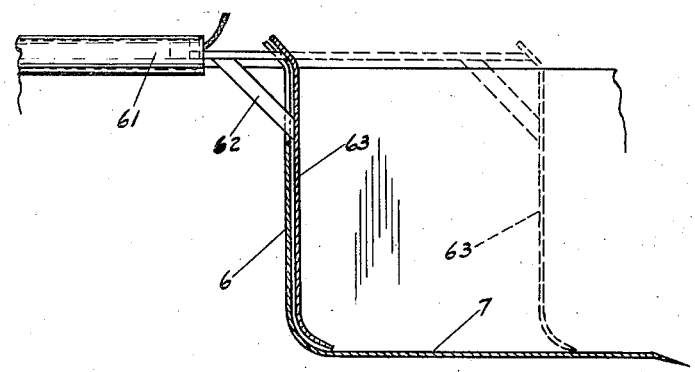
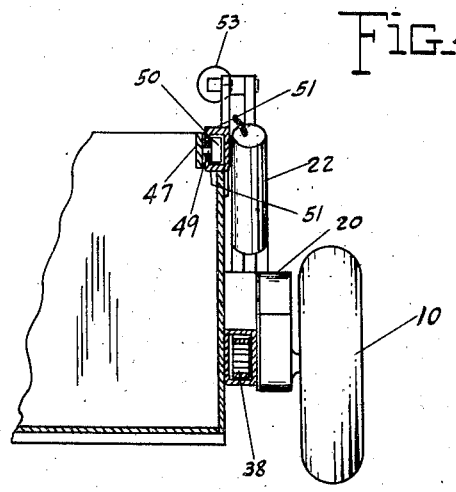
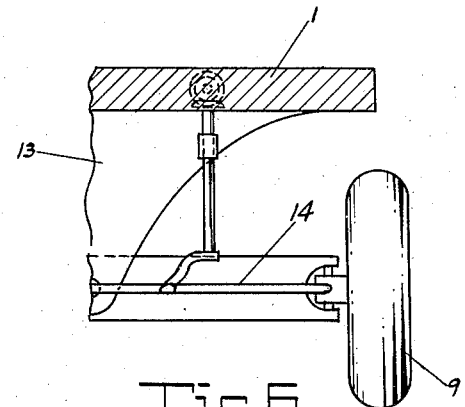

Patented Mar. 12, 1946

2,396,287

UNITED STATES PATENT OFFICE.

2,396,287

SCRAPER VEHICLE

Frank B. Robb, Chagrin Falls, Ohio

Application May 27, 1943, Serial No. 488,759

9 Claims. (Cl. 37—126)

This invention relates to the art of dirt excavating and hauling, and particularly concerns the employment of vehicles adapted to be driven over the surface of the earth or other material, and excavate earth or the like therefrom, and deposit the excavated material into a body to be subsequently carried off at high speed to a place of deposit or fill.

As is well known, the problem exists of economically and efficiently moving large quantities of dirt with machines of the type above referred to. The said machines have been built to accomplish the loading operation in one of two different ways, namely, the load carrying body normally being equipped with a scraper as a trailer type of vehicle, towed by a tractor, or the like, and if a relatively high speed of movement of the material loaded into the body is desired, generally the two parts of the combination are mounted on rubber tires. Therefore, when the scraping action of the scraper of the body is desired to be effected, the scraper is introduced into the ground during forward movement of the vehicle, and as much material as possible is scraped into the body.

However, the tractive effort of the pulling vehicle or tractor is not sufficient to load the body of the trailer vehicle under all conditions, and, therefore, supplementary power is availed of in the form of a pushing tractor normally of the track type, whereby great tractive effort is available to force the scraper through the ground and load the material into the body, and whereby it may subsequently be carried off to the place of deposit or fill by the towing tractor. The other method of accomplishing the operation above described with vehicles of this class, has been to tow a vehicle by a tractor having large or great tractive effort, the said tractor being only capable of movement at relatively low speed, whereby the operation is slowed down undesirably.

A third type of machine which might be mentioned as being availed of is the so-called self contained machine, wherein power is provided for driving what is the equivalent of the trailer of the foregoing mentioned combinations, but in this event supplementary power is also necessary to accomplish a complete loading or pay-load loading of the body.

It is, therefore, an object of this invention to provide an improved construction of scraping machine of a type heretofore proposed, capable of being completely loaded with a pay-load by availing of the power carried by the machine without supplementary or extraneous power applied thereto, said power capable of moving the machine at high speed to carry its pay-load to the dump or fill, and return to the place of scraping at such high speed.

Still another object of this invention is to provide a machine wherein a novel structure or mounting is provided for the traction wheels, or the like, in relation to the body.

A still further object of this invention is to provide an improved machine of the class described, capable of effecting a scraping operation either during movement of the machine to load material into the body carried thereby, or to load the machine independent or regardless of tractive movement of the body.

Another object of this invention is to provide a novel form of drive whereby travel movement of the machine is effected.

It is a still further object of this invention to provide a novel machine of the special kind above referred to, which is equipped with a plurality of scraper members, at least one of the scraper members being susceptible of operation independently of movement of any portion of the frame structure of the machine, supporting same for travel movement.

Still another object of this invention is to provide an improved machine, whereby the scraping operation is effected by a pair of scrapers, one of said scrapers being independently operable to effect a scraping operation and to be subsequently availed of in connection with a closure member upon which its scraping means is mounted, to close the filling opening of the body, or other dirt containing member carried by the machine.

Other and further objects of the invention will be set forth in connection with the description of the invention and in the drawings. The drawings illustrate a preferred embodiment of the invention, although it is not desired that the invention be limited other than by the claims appended hereto.

In the drawings—

Figure 1 is a side elevation of a machine built in accordance with the invention, illustrating the body thereof, in its raised traveling position, and the closure with its scraper in position to maintain a load of dirt, or the like, within the body.

Figure 2 is a side elevation of the machine, wherein the same has been moved into a scraping position and with the supplemental or secondary scraper likewise in scraping position.

Figure 3 is a top plan view of the machine, illustrating the relationship of the various parts thereof.

Figure 4 is a fragmentary sectional view of the discharging member availed of within the body.

Figure 5 is a fragmentary sectional view taken about on the line 5—5 of Figure 1.

Figure 6 is a fragmentary sectional view taken about on the line 6—6 of Figure 1.

Referring now to the drawings, and particularly to Figure 1, the machine is shown as being comprised of a main frame 1, which includes spaced side members 2 at opposite sides, and a rear deck or frame member 3. The frame further comprises substantially vertically depending plates 4 at opposite sides attached to the members 2, and preferably forming side members of a dirt receiving body section of the vehicle, the said body section further including a rear plate member 6, extending transversely of the machine and connected to the side members 4. The bottom member of the body section or body is designated 7, and likewise extends transversely of the vehicle body and is connected in any suitable manner to the side members 4 and the rear plate member 6.

Adjacent the lower ends of the plate or side members 4, previously referred to, a scraper 8 is provided extending transversely of the machine, the said scraper being formed in any well known manner, and suitably fastened to the said side members 4 and the front end of the bottom 7. In order to support the machine for travel movement, the front and rear ends thereof are equipped with pneumatic tired wheels 9 at the rear and wheels 10 at the front.

Referring to the rear construction of the machine, as shown in Figure 3 more particularly, it will be seen that the wheels 9 are mounted on a suitable axle 11, having pivotal connection at 12 with a downwardly extending supporting member 13, attached to the rear frame or deck member 3, the said rear wheels 9 being equipped with conventional steering means generally designated 14, adapted to be controlled by a steering wheel 15 by an operator at the operator's station 16.

The front wheels 10 of the vehicle, as will be seen upon consideration of Figures 1 and 3, are suitably mounted on stub axles 17, the said stub axles being in turn carried by links or pivotal casings 18 and the said pivotal casings 18 in turn being engaged pivotally at 19 with the depending plates or members 4 at opposite sides of the body. The housings 18 upon which the front wheels 10 of the vehicle are mounted are further engaged pivotally at 20 with the piston rods 21 of piston units 22, the said piston units 22 in turn being pivotally engaged at 23 with the frame members 2 at opposite sides of the vehicle for operation in a manner to be hereinafter described.

Upon further study of Figure 1, it will be noted that at the rear of the body plate 6 of the vehicle, and underneath the frame 1 thereof, a suitable power unit 24 is provided, connected securely to the frame 1 of the vehicle, as by braces 25 and 26. The said power unit 24 is equipped with a conventional transmission 27 having change speed gearing therein, the said change speed gearing likewise being adapted to operate a suitable power take-off 28 of conventional construction, whereby a pump 29 may be operated to pressurize a tank 30 for the purposes of actuating the various piston units whereby the machine operations are carried out. The tank 30 is in turn connected by suitable lines 31 to a control panel 32 adjacent the operator's station 16, adapted to be controlled by various levers 33 thereon, as desired by the operator in accordance with the requirements of the machine at its work.

The gearing 27, previously referred to, is provided, as shown in Figures 1 and 3, with any suitable means 34 of connecting the said engine and gearing thereof to a transverse shaft unit 35, suitably supported on the rear plate member 6 of the body at 36, and being equipped intermediate its ends with any well known or conventional type of differential 37.

At the ends of the shaft 35 are provided housings 38 extending along the side members 4 of the body to a point adjacent the pivotal points 19 of the housings 18 previously referred to. Interiorly of these housings 38 are chains 39 adapted to be driven from suitable sprockets 40 on the ends of the shaft 35, and in turn drive similar sprockets 41 at opposite ends of the housing. These sprockets 41 in turn are connected by means of the pivotal means 19 to sprockets 42, interiorly of the housings 18, the said sprockets 42 being equipped with chains 43 in said housings 18 adapted to drive the wheels 10.

It will be noted that the piston units 22, previously referred to as being connected to the housings 18 and to the frame members 2, are provided with suitable conduits 45 leading to the upper and lower ends of the said piston units.

In view of the construction and the manner of driving the front wheels 10, just referred to, it will be noted that upon actuation of the piston units 22, at opposite sides of the vehicle, either independently or simultaneously under the control of the operator at the operator's station 16, a pivotal movement of the housings 18, and thus the wheels 10, may be effected whereby a raising and lowering movement of the scraper 8 and the body carried by the frame 1 takes place. Further reference will be had to this operation hereinafter.

As will be noted upon consideration of Figures 1 and 2, a closure member 46, of arc-shape in cross section, extending transversely of the vehicle, is connected at its upper end to spaced arms 47, and braced with respect thereto by side plate members 48. The said arm members 47 are pivotally and slidably connected at 49, reference being made at this point to Figure 5, to roller members 50 carried within guides or channel members 51, extending interiorly of the frame members 2. The said closure member 46 is provided adjacent its lower edge with a scraper 52 adapted to perform the same or similar operations to the scraper 8, previously referred to. The scraper 52 scrapes by excavating and/or leveling, like usual scrapers employed in the art of this class of vehicles.

The scraper 52, as carried by the closure 46, is controlled for longitudinal movement by means of piston units 53 comprising the customary cylinder and piston parts, similar to the previously described units 22. Said units 53 are suitably fastened at 54 to the arms 47 of the closure unit, and likewise fastened pivotally at 55 to the frame members 2. The said piston units 53 are in reality capable of further control than that previously referred to, in combination with piston units 56. Said piston units 56 are pivotally connected adjacent their upper ends at 57, with the members 47, and at their lower ends at 58 with forwardly extending portions of the body sides 4. The said respective piston units 53 and 56 are, of course, provided with suitable pressure lines 59 and 60 respectively.

It will, therefore, be seen that upon proper manipulation of suitable control means 33 on the control panel 32, adjacent the operator's station 16, the closure unit as comprised by the part 46 and the scraper 52 may be raised into a position, for example, as that shown in dotted lines in Figure 2. Or, by proper manipulation of the said control member 33 or members, the said closure unit may be caused to move into the position shown in dotted lines in Figure 1. The said piston units 56 are further adapted to control the depth of movement of the scraper 52. Likewise, the said piston units 53, by a suitable manipulation of the control member 33, or members, may be caused to assist the piston units 56 in penetration of the earth or other material into which the scraper 52 is introduced, by an outward movement thereof, in combination with a downward movement on the part of the closure unit, as compelled, along with the proper manipulation of the piston units 56.

In order to provide means for forcing a load of material out of the body, having once been introduced thereinto, a suitable piston unit 61, as shown in Figures 1, 2, and 3, and likewise, Figure 4, may be provided, connected by suitable brace means 62 leading to the piston rod thereof, with a transversely extending plate member 63 whereby upon forward movement of the said plate member, as shown in Figure 4, under the control of the movement of the piston within the piston unit 61, material may be forced forwardly over the scraper 8.

It will be apparent that other means for emptying the body of the machine may be availed of such as a tiltable bottom and rear member, under the control of any known fluid pressure or other instrumentalities in accordance with well known practice.

The various parts comprising the machine and certain of their actions have been described. The operation of the machine will now be set forth as respects the preferred manner of operation thereof, and certain alternative methods of operation.

If the machine, as viewed in Figure 2, is moving toward the right, under the power of the motor 24, the operator may, by actuation of suitable control means 33 at the control panel 32, cause the closure unit comprised of the part 46 and the scraper 52, to move outwardly to substantially the position shown in dotted lines in Figure 2. Thereupon, by subsequent manipulation of suitable control means 33, the scraper 8 may be lowered into engagement with the ground or other material to be deposited into the body. It will, therefore, be seen that the housings or arms or links 18, will move into the position shown in Figure 2, whereby upon continued operation of the machine to the right, as shown in Figure 2, the scraper 8 will scrape materials into the body of the machine.

If for some reason the scraper 8 strikes an abutment or obstruction or other impenetrable point, the scraper may, under certain conditions, be permitted to rise, if, for instance, the operator permits the fluid pressure lines at the lower end of the piston units 22 to no longer remain under pressure, and, therefore, the scraper 8 may rise. If, however, this is not desired, and the scraper 8 does ride out of the ground, the closure unit may be brought into action to complete the filling operation of the body by suitable actuation of the piston units 53 and 56, as previously set forth, and by proper manipulation of the valves controlling the said piston units, the scraper 52 may be caused to effect a scraping operation in cycles, if desired, to cause the filling of the body of the vehicle. That is to say, the scraper 52 may be moved toward and from the scraper 8 any number of times, as desired, and, if desired, a picking operation may be effected thereby, as by up and down pivoting.

However, it will be noted that under any conditions, if the tractive effort of the wheels 10 is not sufficient, the entire scraping operation may be effected by the scraper 52, as contrasted with the previously described preferred method of operation.

When the body has been completely filled in accordance with either of the foregoing operations, or in any other manner by which the various parts of the vehicle may be operated, the said closure 46 and scraper 52 are moved into the closing position shown in Figure 1, and thereupon the body is raised into its traveling position by operating units 22, as shown in Figure 1, for subsequent movement of the machine to the place of deposit or fill of the load contained in the body thereof.

At this point, the operator may cause the scraper unit 46—52 to move forwardly away from its position, as shown in Figure 1, and by suitable movement of the plate 63 cause the contents of the body to be deposited on the ground either during movement of the machine to the right, whereby the said contents may be spread, or leveled, by the scraper 8, or when the machine is moving to the left, as viewed in Figure 1, whereby the leveling operation may be effected by the scraper 52, or in any other manner in which the parts are capable of moving.

All power actions of the machine are derived from the motor 24, through storing of pressure in the tank 38, or direct drive to the scraper 8. The power is selectively employed to scraper by tractive effort or independently of the traction, as the scraper 52 can work with or without traction at the wheels 9 and 10.

It should be pointed out that the provision of separate control means for the drive wheels 10 is advantageous to provide adjustment of the scraper 8, or the scraper 52, as the case may be, in accordance with the terrain over which the various operations are to be carried out.

Further, in accordance with the construction of the machine, the said separate control of the wheels 10 does not place any undue strain on the frame of the machine by reason of the pivotal connection of the rear axle 11 with the frame 1.

Further, it is apparent that the rear wheels 9 of the machine may be drivably connected to the power plant 24, in any well known manner, whereby additional tractive effort of the rear wheels of the machine may be availed of.

Summarizing, in reference to the construction of the machine above described, it will be apparent that the same comprises a main frame including the spaced side members 2 and body members 4 of the scraping body, the rear wheels 9 supporting the main frame structure at one end, and the housings 18 constituting wheel arms pivotally connected to the main frame at the other end. The front wheels 10 are carried by the so-called wheel arms or housings 18, and the devices 22 constitute means acting between the said arms and the frame for adjusting the elevation of the body. As previously set forth, certain driving instrumentalities are carried in the housings 38 affixed to the main frame and body parts, and in the housing members or wheel arms 18 previously referred to, whereby the drive from the engine may be transmitted along the sides of the main frame and the body to the wheels 10 carried by the wheel arms or housings 18.

Having thus described my invention, what I claim as new and desire to secure by Letters Patent of the United States is:

1. A vehicle of the class described, comprising front supporting wheels, rear supporting wheels, a frame carried by said rear supporting wheels including a body and adjustable relative to the front wheels, said body including sides and adapted to receive dirt or materials scraped from the ground, a scraper at the front end of said body to scrapingly engage with the ground, means to adjust the frame and body relatively to the front wheels, driving means comprising power means carried by the frame at the rear thereof, driving instrumentalities connected to the power means and supported by the body at opposite sides thereof, and secondary driving instrumentalities for driving the front wheels connected to said first mentioned instrumentalities and the said wheels.

2. A vehicle as claimed in claim 1, in which the adjusting means includes devices for separately adjusting said front wheels relatively to the frame and body.

3. In a scaper vehicle of the class described, in combination, a main frame including a dirt retaining body and side frame members, supporting and traction wheels at the rear and front ends of said main frame, the dirt retaining body being open at its forward end, connections between the rear wheels and said main frame at one end of the latter, wheel arms pivotally connected to the main frame at the other end of the latter, connections between the front wheels and said wheel arms, means connected with the main frame and cooperating with the wheel arms for adjusting the elevation of the dirt retaining body, a power source carried on the main frame, and driving connections leading from said power source to the front wheels including driving elements carried by the side members of the main frame and said wheel arms.

4. A scraper vehicle as claimed in claim 3, in which the adjusting means last referred to comprises power devices acting between the wheel arms and the main frame for effecting relative pivotal movement of said arms and frame for the purpose specified.

5. A scraper vehicle as claimed in claim 3, combined with a scraper located at the front end of the dirt retaining body and adapted to scrape in a forward direction, a rearwardly operable scraper mounted on the main frame and movable independently of the main frame toward the first mentioned scraper, and actuating means for the last mentioned scraper.

6. A scraper vehicle as claimed in claim 3, characterized in that the side frame members constitute housing parts and the wheel arms constitute housing parts, said housing parts enclosing the driving connections.

7. A scraper vehicle as claimed in claim 3, combined with a scraper carried by the front end of the dirt retaining body, a second scraper arranged in advance of the said first scraper, means slidably and pivotally connecting the second scraper to the main frame for movement independent of the latter, actuating means for the last mentioned scraper for effecting positive downward ground penetrating action thereof, and means for moving the second scraper toward the first scraper after it has been caused to penetrate the ground for a digging scraping action.

8. A scraping vehicle as claimed in claim 3, combined with a bottom member for the dirt receiving body, a forwardly extending scraper carried at the front end of said bottom member and further combined with a front scraper mounted on the main frame and constituting closing means for the front end of the dirt retaining body and movable vertically and at a point in advance of the front wheels, means for positively shifting said front scraper upwardly and pulling said front scraper positively downwardly into ground penetrating position, and means for moving said front scraper rearwardly while in its ground penetrating position.

9. A scraper vehicle comprising a main frame including a scraper body, rear wheels supporting one end of the main frame, wheel arms pivotally connected to the frame adjacent to the other end, front wheels carried by the wheel arms, means acting between the arms and main frame for adjusting the elevation of said main frame and body, a power plant carried by the main frame, and driving connections extending from the power plant along the main frame to the points of connection of the wheel arms, other driving connections leading from the last mentioned driving connections along the wheel arms to the front wheels, and a closure member for the body mounted on the main frame and movable adjacent to the front wheels toward and from the body.

FRANK B. ROBB.